Oct. 1, 1957  D. M. ADAMS  2,807,899
LICENSE PLATE DISPLAY DEVICE
Filed Dec. 22, 1953  2 Sheets-Sheet 1
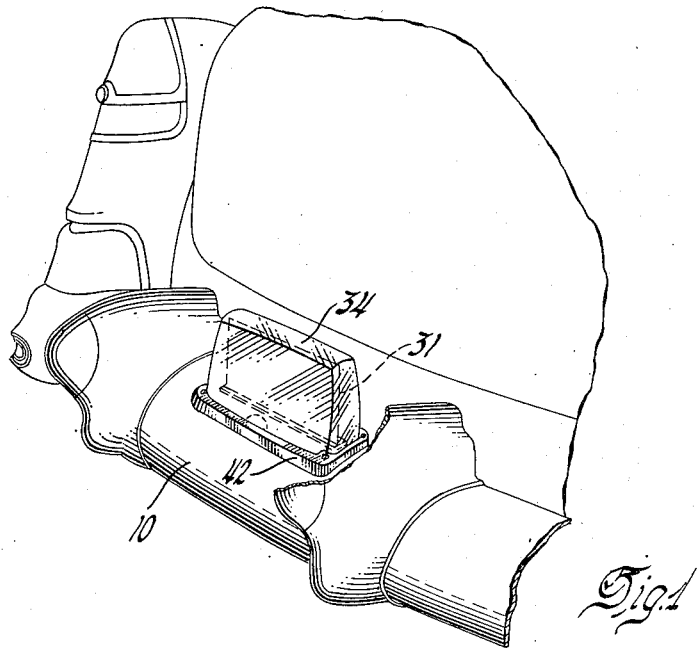
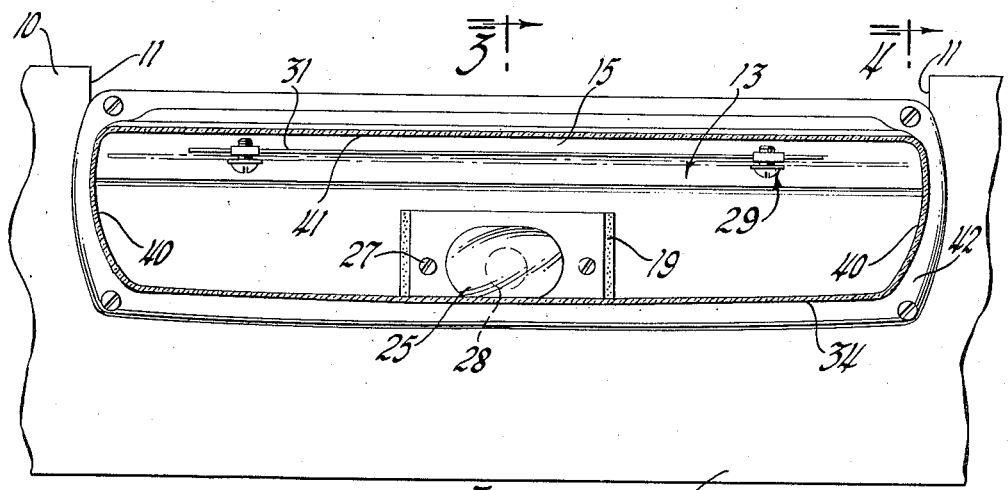
INVENTOR
Daniel M. Adams
BY L. D. Burch Oct. 1, 1957 D. M. ADAMS 2,807,899
LICENSE PLATE DISPLAY DEVICE
Filed Dec. 22, 1953 2 Sheets-Sheet 2
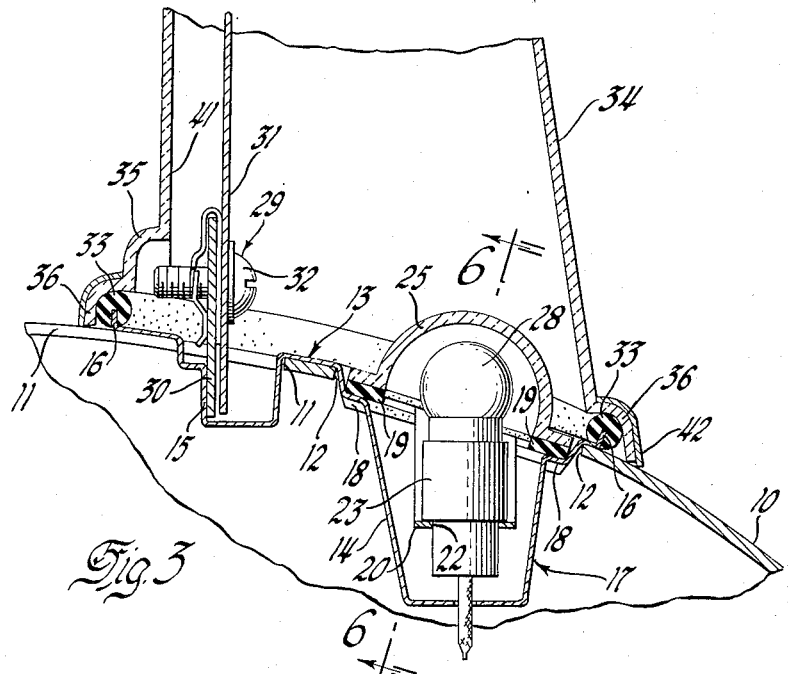
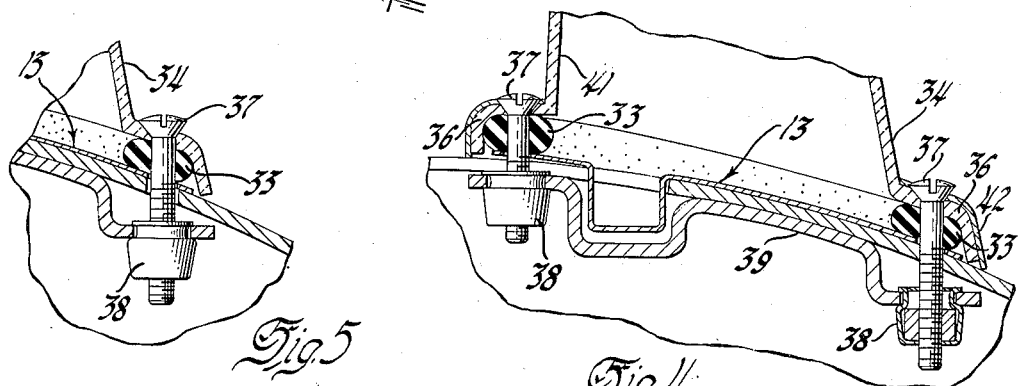
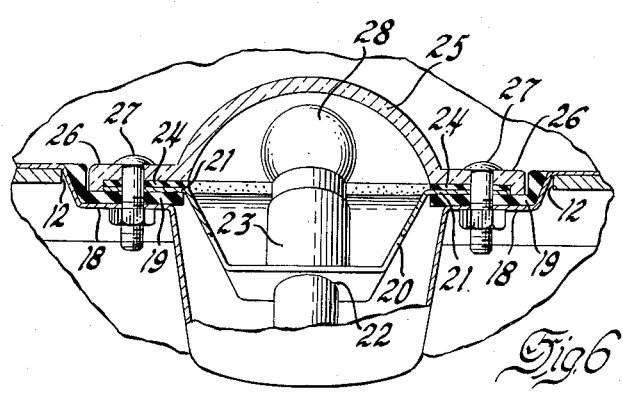
INVENTOR
Daniel M. Adams
BY L. D. Busch

United States Patent Office 2,807,899
Patented Oct. 1, 1957

2,807,899

LICENSE PLATE DISPLAY DEVICE

Daniel M. Adams, Birmingham, Mich., assignor to General Motors Corporation, Detroit, Mich., a corporation of Delaware Application December 22, 1953, Serial No. 399,768

2 Claims. (Cl. 40—132)

This invention relates to illuminated license plate mounting assemblies, and more particularly to bumper-mounted assemblies having covers associated therewith.

Many States require that automobile license plates be illuminated so that they may be seen at night, and that the license plates and illuminating means be kept clean and free of obstructions so that the plates may be read at all times.

Attempts have been made to provide illuminated license plate mountings adapted to be enclosed or covered to protect the plate and the illuminating means from dust, mud, rain, snow, and the like. It is much easier to clean a smooth glass window covering the plate, for example, than it is to clean a rusted and irregular license plate surface having bolts and the like projecting therefrom. Also, fewer electrical failures will occur when a cover is provided.

However, present day illuminated license plate mountings leave much to be desired. Dust and moisture still work their way into the cover to eventually obscure the view of the plate, reduce the effectiveness of the lamp, and to deteriorate the electrical connections. This is true because the covers are cheaply made from a plurality of parts so that sharp corners and crevices exist where dust and moisture may collect and enter. Joints are not properly and positively sealed. The sharp corners and irregular surfaces make cleaning difficult, and sometimes hazardous. Glass windows often break and are not replaced, and the parts corrode and rust and eventually fail. If actual failure does not occur, then at least the parts loosen and rattle.

Another reason why the license plate mountings presently used are not satisfactory is that they have not been designed to blend into the exterior styling of the automobile. Thin plates mounted without trim, or mounted within unattractive frames or covers having square corners, do not complement the luxurious and smooth lines of present day styling. In the more expensive automobiles, trim and accessories tend to be massive and to merge into the general contour of the body. The trend is also to combine accessories so that they appear to be fewer in number, yet perform multiple functions.

It is now proposed to provide an enclosed and illuminated license plate assembly for bumper mounting which is positively sealed against the entry of dust and moisture by the novel use of rubber seals or the like throughout the assembly. Because of this novel construction, the parts making up the assembly may not rattle. It is also proposed to provide such a mounting in which the means by which the parts are secured together is hidden from view so as not to detract from the appearance of the automobile. In addition, the proposed assembly includes a novel cover which blends into the styling of the bumper of the automobile, and of the automobile itself. Together with all the advantages already pointed out, the proposed assembly is also easily assembled, and easily and safely cleaned.

In the drawings:

Figure 1 is a fragmentary perspective view of the rear of an automobile, with portions thereof broken away to better illustrate the details of construction of a bumper-mounted license plate assembly embodying the invention.

Figure 2 is a top plan view of the license plate assembly shown by Figure 1, with portions thereof broken away and in cross-section.

Figure 3 is a fragmentary cross-sectional view taken along the plane of line 3—3 of Figure 2 and looking in the direction of the arrows.

Figure 4 is a fragmentary cross-sectional view taken along the plane of line 4—4 of Figure 2 and looking in the direction of the arrows.

Figure 5 illustrates a modification of the right hand portion of Figure 4.

Figure 6 is a fragmentary cross-sectional view taken along the plane of line 6—6 of Figure 3 and looking in the direction of the arrows.

Referring to the drawings in more detail, a bumper 10 may be formed to provide a recess 11 and an aperture 12. Base member 13 may be formed from a single piece of metal to provide a depression 14 serving as a lamp housing and receivable in aperture 12 and an elongated depression 15 serving as a license plate bracket support and a receptacle for license plate 31 and receivable in recess 11. Member 13 may also be formed to provide upturned flanges 16 along the sides thereof. The remaining portions of member 13 are adapted to engage the upper surfaces of bumper 10 and to receive the various necessary fastening means.

In the lamp subassembly 17, depression 14 is provided with shoulders 18 to support the rubber seal 19 thereon. Lamp socket support 20 is provided with flanges 21 to rest on rubber seal 19, as well as with aperture 22 to receive lamp socket 23. Another rubber seal 24 may be applied over the flanges 21 of the lamp socket support 20. Lamp cover 25 is provided with shouldered flanges 26 to engage rubber seals 19 and 24. The entire lamp subassembly 17 may then be secured by any suitable fastening means 27. In this manner, the lamp subassembly 17 is made airtight so that moisture and dust cannot enter to corrode or deteriorate the necessary electrical connections for lamp 28.

In the license plate subassembly 29, bracket 30 is secured, in any suitable manner, to a wall of the elongated depression 15 and bracket 30 may be provided with suitable apertures so that license plate 31 may be secured to bracket 30 by suitable fastening means 32.

With subassemblies 17 and 29 secured to member 13 and with member 13 applied to bumper 10 through recess 11 and aperture 12, an endless rubber gasket 33 is applied over the ends of the one-piece base member 13, as shown by Figure 4, and over flanges 16, as shown by Figure 3. A one-piece cover 34 having a flange 35 to provide room for fastening means 32 and flanges 36 to engage gasket 33 may then be fitted over subassemblies 17 and 29 and tightened against the bumper 10 by any suitable means such as bolts 37, nuts 38, and brackets 39 to provide an airtight seal with gasket 33, as shown by Figure 5. Thus, the entire assembly is protected from dust and moisture by means of rubber seals. It is to be understood, of course, that any suitable material may be used in the place of rubber.

Cover 34 may be constructed from a transparent material such as plastic and may be metalized or otherwise coated on the inner surfaces 40 and 41 thereof to create the appearance that the cover 34 is made of the same material as the bumper and is a part thereof. These surfaces may also be suitably coated to better reflect light from lamp 28 onto license plate 31. Also frame 42 may be fitted over the flanges 36 to give more support to the flanges 36 and to enhance the appearance of the entire structure.

It will be observed from the foregoing drawings and description that there has been provided an illuminated and covered license plate mounting which is relatively simple and compact in structure and which is completely and positively sealed against the entrance of dust and moisture. It will also be observed that the assembly, in addition to performing a necessary function, enhances the beauty of the automobile. Since the outer surfaces of the assembly are smooth, cleaning may be easily and safely done. Furthermore, the structure is such that there are a minimum number of parts that are subject to failure due to rusting or breakage.

What is claimed is:

1. A license plate and lamp assembly adapted to be mounted on a bumper, comprising a one-piece combination lamp housing and license plate bracket support receivable in spaced openings in the top surface of said bumper, a lamp socket resiliently mounted on said housing, a lamp cover resiliently mounted on said housing, a license plate bracket secured to said support behind said lamp socket and adapted to support a license plate above said bumper, and a one-piece cover for all the above named parts of said assembly, said cover being also resiliently mounted on said bumper.

2. A license plate and lamp assembly adapted to be mounted on a bumper, comprising a combination lamp housing and a license plate bracket support receivable in spaced openings in the top surface of said bumper, a lamp socket resiliently mounted on said housing, a lamp cover resiliently mounted on said housing, a license plate bracket secured to said support behind said lamp socket and adapted to support a license plate above said bumper, and a one-piece cover for all the above named parts of said assembly, said cover being also resiliently mounted on said bumper and said cover comprising a plastic container open on the side thereof facing said bumper and receiving said license plate.

References Cited in the file of this patent

UNITED STATES PATENTS

| 2,158,195 | Mutti | May 16, 1939 |
| 2,167,791 | Wyatt | Aug. 1, 1939 |
| 2,239,343 | Rumbaugh | Apr. 22, 1941 |
| 2,361,479 | Joffo | Oct. 31, 1944 |
| 2,540,221 | Hoeve et al. | Feb. 6, 1951 |
| 2,559,163 | MacDonald | July 4, 1951 |
| 2,648,152 | Simpson | Aug. 11, 1953 |

FOREIGN PATENTS

| 627,798 | Great Britain | Aug. 16, 1949 |